United States Patent
Hager et al.

(10) Patent No.: US 10,659,772 B1
(45) Date of Patent: May 19, 2020

(54) AUGMENTED REALITY SYSTEM FOR LAYERING DEPTH ON HEAD-MOUNTED DISPLAYS USING EXTERNAL STEREO SCREENS

(71) Applicant: DISNEY ENTERPRISES, INC., Burbank, CA (US)

(72) Inventors: Joseph George Hager, Valencia, CA (US); Loyal J. Pyczynski, Valencia, CA (US); Lanny S. Smoot, Thousand Oaks, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 16/391,508

(22) Filed: Apr. 23, 2019

(51) Int. Cl.
| | |
|---|---|
| *H04N 13/363* | (2018.01) |
| *G02B 27/14* | (2006.01) |
| *H04N 13/398* | (2018.01) |
| *G02B 27/28* | (2006.01) |

(52) U.S. Cl.
CPC .......... *H04N 13/363* (2018.05); *G02B 27/14* (2013.01); *G02B 27/288* (2013.01); *H04N 13/398* (2018.05)

(58) Field of Classification Search
CPC .... G03B 21/62; G03B 21/608; G02B 27/017; G02B 27/0081; G02B 27/0172; G02B 27/4277; G02B 2027/0093; G02B 2027/0123; G02B 2027/0127; G02B 2027/0134; G02B 2027/0178; G02B 2027/0187; H04N 13/344; H04N 13/302; H04N 13/363; H04N 13/366; H04N 13/368; H04N 13/398
See application file for complete search history.

(56) References Cited

U.S. PATENT DOCUMENTS

| | | | |
|---|---|---|---|
| 2015/0234205 A1* | 8/2015 | Schowengerdt | G02B 3/0006 351/159.02 |
| 2017/0059869 A1* | 3/2017 | Lee | G02B 30/24 |
| 2019/0086674 A1* | 3/2019 | Sinay | G02B 27/0172 |
| 2019/0196771 A1* | 6/2019 | Kunitomo | G06F 3/1423 |

* cited by examiner

*Primary Examiner* — Sultan Chowdhury
(74) *Attorney, Agent, or Firm* — Snell & Witmer L.L.P.; Kent A. Lembke

(57) ABSTRACT

An augmented reality (AR) system that enhances an AR participant's experience by providing a visual effect with added depth. The AR system displays previously achieved by an AR HMD are augmented with a second layer of accessible depth. This added depth is achieved by including, in the AR space/real world environment, external stereo screens upon which 3D stereo content is projected by one or more 3D projectors. The AR HMD is equipped with an external 3D screen viewing assembly so the AR HMD allows an AR participant wearing the AR HMD to view images on the external stereo screens in stereo. The external stereo screens can be used to produce 3D imagery that may differ in depth from the depth of the fixed focal length images displayed to the viewer by the AR HMD. The AR system enlarges the AR participant's simultaneous angular viewing range to 55 to 160 degrees.

25 Claims, 8 Drawing Sheets

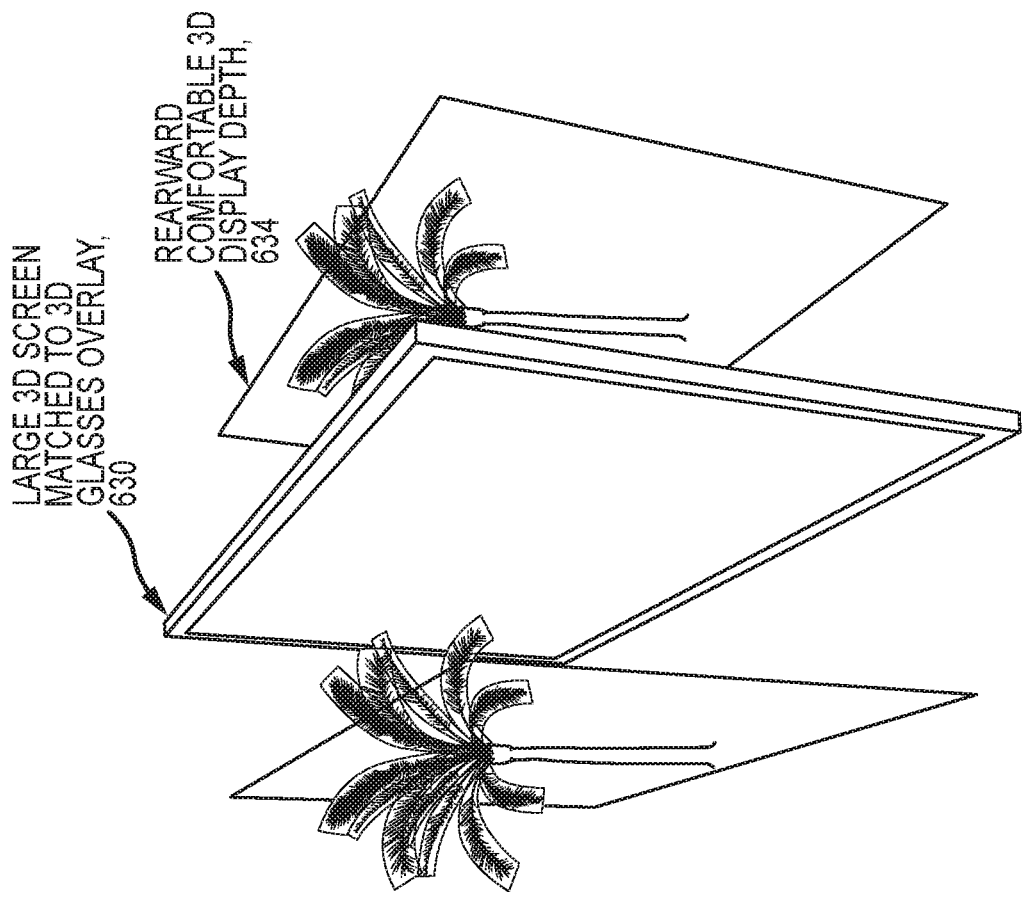
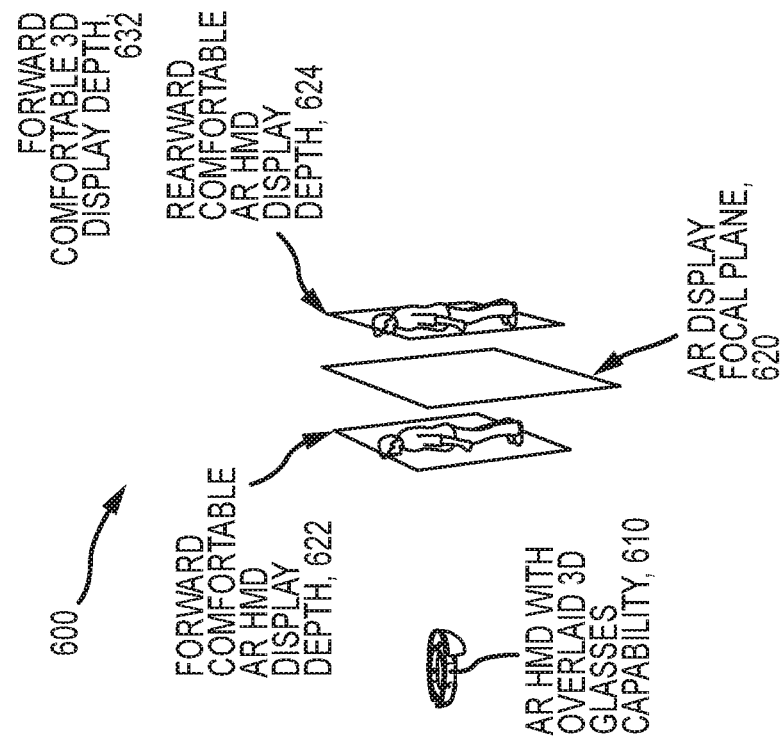
FIG. 6

AUGMENTED REALITY SYSTEM FOR LAYERING DEPTH ON HEAD-MOUNTED DISPLAYS USING EXTERNAL STEREO SCREENS

BACKGROUND

1. Field of the Description

The present description relates, in general, to augmented reality (AR) and systems and methods for providing AR experiences to participants. More particularly, the description relates to a new AR system that is adapted to provide imagery and depth beyond the conventional AR imagery that is provided at specific focal distances of each head-mounted display (HMD) of the AR system.

2. Relevant Background

The use of augmented reality (AR) is rapidly expanding in the entertainment industry, in educational settings, and in commercial or business applications. In brief, AR is an interactive experience of a real world environment where the physical objects that reside in that real world are augmented with computer-generated information. Often, the augmentation will be visual and bring digital images into the AR participant's real world.

In most AR systems, a head-mounted display (HMD) is provided for each AR participant. An HMD is a display device worn on the head and has a small display optic in front of each eye. In AR systems, optical HMDs may be used that reflect projected images while also allowing a user to see through the display optics. An optical mixer, which may be made of partly silvered mirrors, may be used to reflect artificial or digital images and let real world images pass through to let a user look through it into the nearby real world. In this way, AR HMDs operate to layer virtual information over a see-through view of the external world.

As noted above, a typical display in an HMD includes a transparent optical system that allows the wearer to see through it, while simultaneously acting as a reflective magnifying system that allows a viewer's eyes to focus on a built-in, close-up display. The designer of the HMD's optical system must choose an HMD focal distance at which images provided via the internal display (e.g., a small flat optic screen virtually positioned in front of each eye) will appear to be located out in front of the viewer in the real world. In other words, the virtual objects provided by the AR system through each HMD appear to the wearer of the HMD to be in a plane a predefined and fixed distance out in the real world, with typical HMD focal distances being in the range of 4 to 10 feet.

The displays within the HMD typically are used to present stereo images to the wearer (or viewer). In this regard, each of the displays is used to present separate images (left and right eye images) to each of the viewer's eyes that when perceived together provide a three dimensional (3D) virtual object or image at the HMD focal or optical display plane in the real world. The lateral disparity of objects in these images produces a stereo effect that for all intents and purposes causes the viewer to believe the images they are seeing are anywhere from a foot or so from their face out to optical infinity. However, the stereo disparity imagery only matches the HMD's optical display plane at a specific distance (e.g., in the 4 to 10 foot range for most available HMDs). It is only when a virtual object is displayed with a disparity that matches the HMD focal distance that the viewer's eyes will receive comfortably matched visual stimuli. At other distances, although the viewer will perceive three dimensional stereo (i.e., their eyes will "toe-in" an amount corresponding to the disparity), they will be focused at the fixed distance dictated by the optical design of the display.

The mismatch in focus and disparity may cause the viewer to visually misinterpret the intended distance to displayed objects, cause the object's depth to be ambiguous, or, in the worst cases, cause viewing discomfort. Recently, there has been a desire to enhance AR systems by adding depth by allowing virtual objects to be provided at distances differing from the focal distance. However, the addition of depth in AR systems has proven difficult to date due in part to the issues of a fixed display plane and matching of lateral disparity to the HMD's focal distance.

Hence, there remains a need for a new AR system that is configured to layer virtual objects and/or 3D imagery in planes that differ from the fixed display plane of an HMD. Preferably, the new AR systems would be useful with nearly any existing or yet-to-be-invented HMD technologies or the optical display and other AR-providing components of HMDs.

SUMMARY

In brief, a new AR system is taught that enhances an AR participant's or viewer's experience by providing a visual effect with added depth. The AR system is configured so that displays previously achieved by an AR HMD are themselves augmented with a second layer (or three or more layers) of accessible depth. In some embodiments, this added depth is achieved by including, in the AR space/real world environment, external stereo (or 3D) screens (e.g., external to the AR HMD) upon which 3D stereo content is projected by one or more 3D projectors. In the new AR system, the AR HMD is equipped with an external 3D screen viewing assembly so that the AR HMD allows a viewer or AR participant wearing the AR HMD to view 3D images or content on the external stereo screens in stereo. The external stereo screens can be used to produce stereo information that may differ (in content and/or location (or depth)) from the fixed focal length virtual images displayed to the viewer within the AR HMD by its transparent HMD optical system. The new AR system is in some cases (such as when a theater sized screen is included) used for enlarging the instantaneous field of view of a viewer (e.g., up to 160 degrees or more).

More particularly, an augmented reality (AR) system is described that is configured for providing augmenting images at additional depth layers to AR participants. The AR system includes an AR space containing physical objects, and an AR head mounted display (HMD) is provided that is wearable by an AR participant while they are in the AR space. Further, the AR system includes, in the AR space, a display screen displaying stereo content using a stereo display technology. During AR system operations, an optical system in the AR HMD displays, to the AR participant wearing the AR HMD, objects at an HMD focal distance via transparent displays to augment the physical objects in the AR space.

Also, the AR HMD includes an external screen viewing assembly that is adapted based on the stereo display technology to receive light associated with the displayed stereo content on the display screen and provide left eye content to a left eye of the AR participant wearing the AR HMD and right eye content to a right eye of the AR participant wearing the AR HMD. In many cases, the display screen is positioned in the AR space a distance from the AR participant that differs from the HMD focal distance and often it will be quite a bit larger (e.g., over 10 feet whereas the focal distance or display depth of the optical system of the HMD may be 1 to 8 feet or the like), and the display screen may be quite large (e.g., up to the size of conventional movie theater screens).

In one implementation, the stereo display technology is an interference-filter-based technology (e.g., Dolby 3D or the like), and the external screen viewing assembly includes left and right eye interference filter sheets positioned to be between the left and right eyes, respectively, of the AR participant wearing the AR HMD and the display screen. In this implementation, the display screen includes a projection screen, and the system further includes a 3D projector projecting stereo content using the interference filter-based technology.

In another exemplary implementation, the stereo display technology is a polarization-based technology, and the external screen viewing assembly includes left and right eye polarization sheets for this particular polarization-based technology that are positioned to be between the left and right eyes, respectively, of the AR participant wearing the AR HMD and the display screen. In this implementation, the display screen includes a projection screen, and the system further includes a 3D projector projecting stereo content using the polarization-based technology.

In a different implementation, the stereo display technology is a 3D shutter-based technology, and the external screen viewing assembly includes left and right eye 3D shutters positioned to be between the left and right eyes, respectively, of the AR participant wearing the AR HMD and the display screen. In this implementation, the display screen includes a projection screen, the system further includes a 3D projector projecting stereo content using the 3D shutter-based technology, and the 3D projector and the left and right eye 3D shutters are time synchronized so the left eye shutter is open (or passes light) when left eye content is displayed and the right eye shutter is closed (and vice versa).

In another useful implementation, the stereo display technology is a retroreflective imaging-based technology. In this implementation, the external screen viewing assembly includes left and right eye projectors positioned in the AR HMD (e.g., microprojectors positioned near where a viewer's left and right eye would be when wearing the AR HMD) to project left and right eye content into the AR space and onto a surface of the display screen. The surface of the display screen is covered (at least partially) with retroreflective screen material. Often, in such implementations, the optical system of the AR HMD includes a left eye beamsplitter and a right eye beamsplitter, and the left and right eye projectors of the external screen viewing assembly project light onto a side of the beamsplitter for reflection outward from the AR HMD into the AR space.

BRIEF DESCRIPTION OF THE DRAWINGS

FIG. 6 is a schematic illustration of an AR system of the present description showing concurrent display of imagery with an HMD optical system and imagery at a different depth/distance using 3D projection technologies and a 3D screen viewing assembly in the AR HMD worn by the viewer;

DETAILED DESCRIPTION

Figure 1:
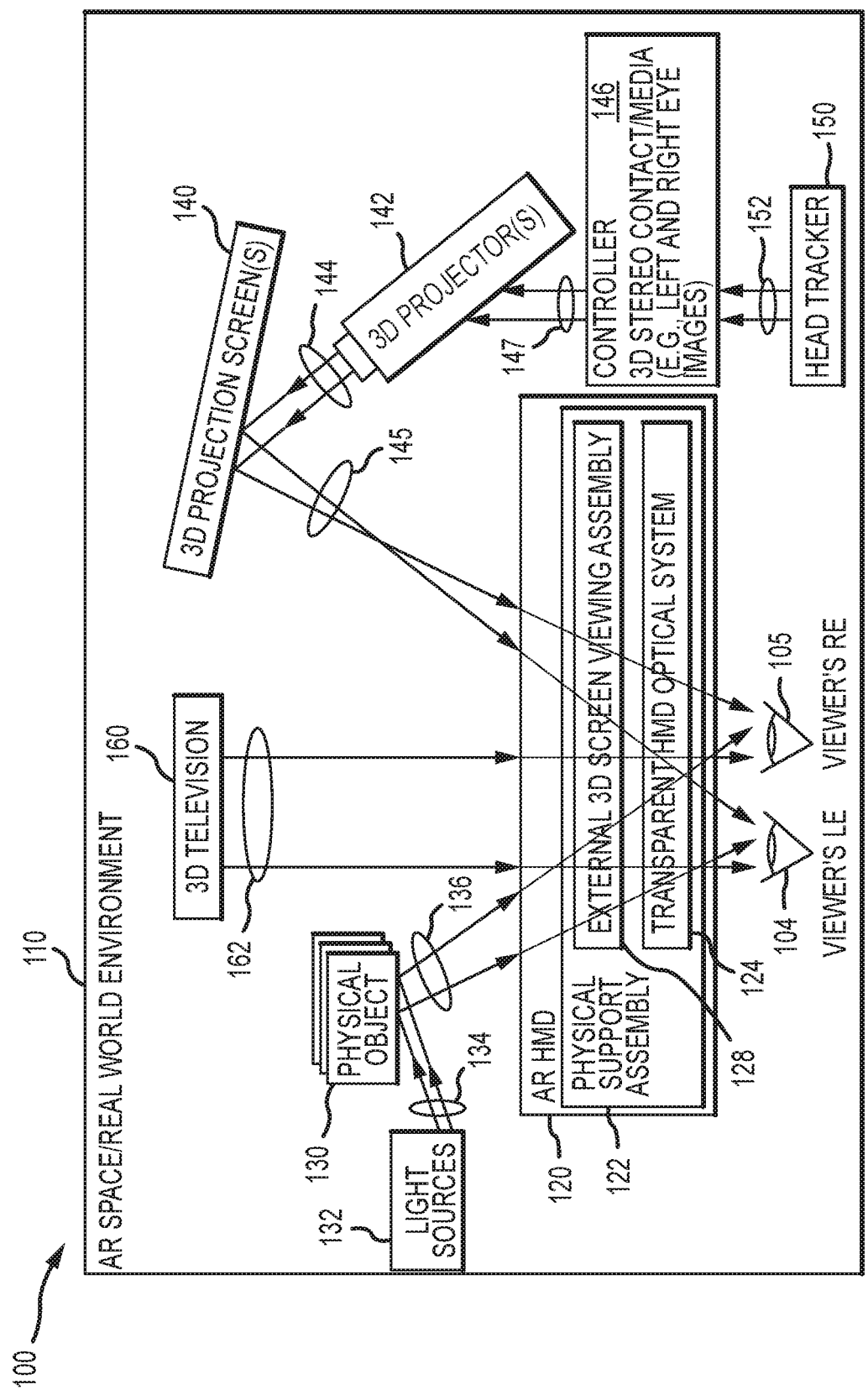
FIG. 1 illustrates a functional block diagram of an augmented reality (AR) system configured to provide depth layering according to the present description.

Briefly, an augmented reality (AR) system is described that is particularly useful in providing additional depth by displaying 3D imagery to a viewer wearing a specially-adapted or new AR head-mounted display (HMD) at one or more depths or distances that vary from the focal distance of the AR HMD's optical system.

For instance, an AR HMD may have a transparent optical system with a fixed focal position for its displayed virtual image of six feet from the viewer (i.e., AR participant wearing the AR HMD). Virtual images that are four to eight feet from the viewer could likely be displayed without significant error between their focus and disparity stimuli. To display objects at greater distances with a high degree of comfort, a stereo viewing screen can be included in the AR system and set up at a distance greater than eight feet such as twenty feet away from the viewer. The AR HMD may be overlaid with (or otherwise include) crossed polarizers to support stereo viewing on the stereo viewing screen (which may be quite large in some cases and projected upon by a 3D projector utilizing polarization-based 3D stereo technology in this non-limiting example). This stereo (or 3D) viewing is in addition to or concurrent with the virtual object viewing provided by the transparent HMD optical system. Thus, with proper optical design, the viewer is furnished, by the new AR system, with a comfortable viewing experience over a very wide range of perceived distances for displayed stereo content (or 3D images).

The components included in the AR system for providing the external stereo view may include a number of alternate embodiments. For example, Dolby-stereo color filters may be placed over (or adjacent in front or behind) each HMD lens of the transparent HMD optical system and used with Dolby-coded imagery projected by 3D projectors onto the external stereo screen(s). In another embodiment, the AR HMD may be fabricated to include an electronic shutter for each of the viewer's eyes, and these shutters may be synchronized to the display of left and right eye images on the external stereo screen. Indeed, nearly any existing method for providing stereo images on screens can be applied in the new AR system, with the external (or internally integrated) 3D (or stereo) screen viewing assembly provided in the AR HMD being chosen to suit the 3D stereo technology used to display stereo content on the external stereo screen in the AR space.

The new AR system and its components not only increase an AR system's ability to accurately and comfortably represent different viewing distances but can also be designed and used to greatly enlarge the viewer's simultaneous angular viewing range (e.g., the apparent width/height of the entire vista). Most of the currently affordable HMDs support a relatively narrow horizontal field of view (e.g., 50 degrees or so at a time). When the new AR system is used with a theater-sized screen, this view could enlarge such as up to 160 degrees or more of horizontal view (e.g., enlarged view in the range of about 55 to 160 degrees (or more)), which would be coupled to the AR display's (sliding) augmented view. This would vastly increase a viewer's perception of the imagery's size and splendor and would increase the sense of immersion.

FIG. 1 illustrates a functional block diagram of an augmented reality (AR) system 100 configured to provide depth layering according to the present description. The system 100 includes an AR space or real world environment 110 in which a viewer is positioned (as shown by their left and right eyes 104 and 105). The AR system 100 includes an AR HMD 120 adapted to allow the viewer to perceive depth layers beyond those provided by a conventional HMD. In this regard, the AR HMD 120 is worn by the viewer, and, specifically, the AR HMD 120 includes a physical support assembly 122 that allows it to be worn (e.g., glasses, goggles, helmet, or other headgear) and supports other components to place them in front of (or to cover) the viewer's left and right eyes 104 and 105.

Particularly, the physical support assembly 122 supports a transparent HMD optical system 124 of the AR HMD 120. The transparent HMD optical system 124 may take the form of optical systems used in presently available (and yet to be invented and/or distributed) AR HMDs, with a common design including transparent displays being positioned in front of the viewer's left and right eyes 104 and 105. The optical system 124 is operable (as discussed above) to display digital augmenting data (information, virtual objects, and the like) on these two transparent displays that have a fixed focal distance so that it appears to be located in the AR space on a focal plane a distance apart from the viewer (e.g., 4 to 10 feet or the like). The transparency of the displays (or display) allows the viewer to also view the AR space/real world environment. For example, the AR system 100 may include one or more physical objects 130 positioned in the AR space 110 that are illuminated as shown at 134 by one or more light sources 132. Reflected light 136 from the physical object is received at the AR HMD 120 and passes (at least in part) through the transparent HMD optical system 124 (or its transparent displays) to the viewer's left and right eyes 104 and 105 along with digital information projected or otherwise provided on the transparent displays to augment the AR space.

More significantly, the AR HMD 120 further includes a 3D screen viewing assembly 128 that is configured to allow the viewer (or wearer of the AR HMD 120) to view other stereo content displayed in the AR space 100. As shown, the AR system 100 includes a 3D projection or stereo screen(s) 140 positioned a distance from the viewer in the AR space 110. This may be nearly any size screen, but it may be useful in some cases to use a large stereo screen (similar to those in movie theaters) to provide large background-type imagery to the viewer. The AR system 100 further includes one or more 3D or stereo projectors 142 whose output (left and right eye images) 144 is directed onto a surface of the stereo screen 140. As discussed below, the projector(s) 142 may be provided in the form of microprojectors supported by or in the support assembly 122 of the AR HMD 120, and, in this case, the projection screen 140 is modified to include a retroreflective material on its side facing into the AR space or the viewer wearing the AR HMD 120.

Light from the screen 145 is received at the AR HMD 120, and the external 3D screen viewing assembly 128 acts to direct left eye images to the left eye 104 and right eye images to the right eye 105 to allow the viewer to perceive stereo (or 3D images) at the additional depth layer provided by the screen's surface. The left and right images in light 145 are also allowed by the transparent displays of the HMD optical system 124 to reach the left and right eyes 104 and 105 of the viewer/HMD wearer, even while the viewer is observing virtual objects provided by the HMD optical system 124.

A controller 146 is provided that operates to selectively provide the stereo content 147 to the 3D projector(s) 142, and this content may be nearly any 3D stereo content/media. The imagery displayed in the AR HMD 120 via the HMD optical system 124 and on the external screen 140 (external to the support assembly 122) may both be driven by the gaze direction of the HMD user. To this end, a head tracker or similar device 150 may be used to track or determine the viewer's current gaze direction. This information may be provided, as shown at 152, to a controller 146 in the AR system 100 to select the content 147 displayed on the external screen 140 and further provided to a controller (not shown but known from conventional AR HMDs) in the AR HMD 120 to allow it to select and/or modify the content it displays with its transparent HMD optical system 124. In practice, objects in the real world 110 and in the HMD internal display of optical system 124 as well as the external screen 140 can all be designed to appear stationary in the AR space with respect to the viewer's gaze direction, thus enhancing the viewer's sense of their reality.

Nearly any 3D stereo technology may be utilized to implement the AR system 100 with the 3D projector 142 and its output content 144 on screen 140 being matched with the external 3D screen viewing assembly 128. Generally, components typically provided in 3D or stereo glasses (or other headwear) for a particular 3D projector/screen (or 3D television 160) are instead provided in the AR HMD in front or behind the transparent displays of the HMD optical system 124 (anywhere in the AR HMD between the screen 140 (or 3D television 160) and the viewer's eyes 104 and 105). For example, the projector 142 may be configured (along with content 147 from controller 146) to utilize anaglyph stereo technology, polarization stereo technology, eclipse or shutter technology, or interference filter stereo technology, and the external 3D screen viewing assembly 128 would be configured to process/filter/shutter light 145 in a manner suited to the stereo technology of the projector 142 to provide left eye images to the left eye 104 and right eye images to the right eye 105.

With anaglyph technology, two image images provided on the screen 140 are superimposed in an additive light setting through two filters, one red and one cyan. The external 3D screen viewing assembly 128 then includes colored filters to cover each eye 104 and 105 to separate the appropriate image by canceling the filter color out and rendering the complementary color black. With polarization technology, a stereoscopic image is provided on the screen 140 by projecting 144 two images through different polarizing filters that are superimposed on the screen 140. The external 3D screen viewing assembly 128 in this case includes a pair of polarizing filters that are oriented differently so that each filter passes only light 145 that is similarly polarized and blocks the light 145 that is polarized differently so that each eye 104 and 105 sees a different image (the intended left and right images in the stereo content 147 from controller 146).

With the eclipse/shutter technique, a shutter in the assembly 128 blocks light 145 from each appropriate eye when the converse eye's image is projected 144 by the projector 142 on the screen 140. The display on screen 140 alternates between left and right eye images, and the assembly 128 is adapted to open and close the shutters (or allow and not allow light transmission as in LCD shutter glasses) in synchronization with the images on the screen 140 (or 3D television 160). With the interference filter technology, specific wavelengths of red, green, and blue light are displayed 144 on screen 140 for the right eye 105 and different wavelengths of red, green, and blue light are displayed 144 on screen 140 for the left eye 104. In this AR system implementation, the viewing assembly 128 includes a filter for each eye 104 and 105 that filters out the very specific wavelengths to allow the wearer to see a 3D image (by passing left eye images to the left eye 104 and right images to the right eye 105). A common example of the interference filter technology is found in Dolby 3D systems, in Omega 3D/Panavision 3D systems, and the like. Hence, the 3D projector 142, controller/media server 146 (and the stereo content 147 projected as shown at 144), and screen 140 combined may be thought of as being a stereo display or projection system that may be configured to implement a particular stereoscopic or stereo technology to provide left and right eye images.

In some embodiments, a 3D television 160 is provided in the AR space of the AR system 100 and operated to display stereo content to the viewer. In such cases, light (with left and right eye images) 162 is directed toward the AR HMD 120 where it is processed or filtered by the external 3D screen viewing assembly 128 to direct left and right eye images, respectively, to the left and right eyes 104 and 105. The 3D stereo technology of the external 3D screen viewing assembly 128, in this case, is chosen to suit the technology used by the 3D television 160 to display stereo content to a viewer such as polarization filters, shutter lenses, Dolby-type filters (or, more generally, interference filters), or the like.

Figure 2:
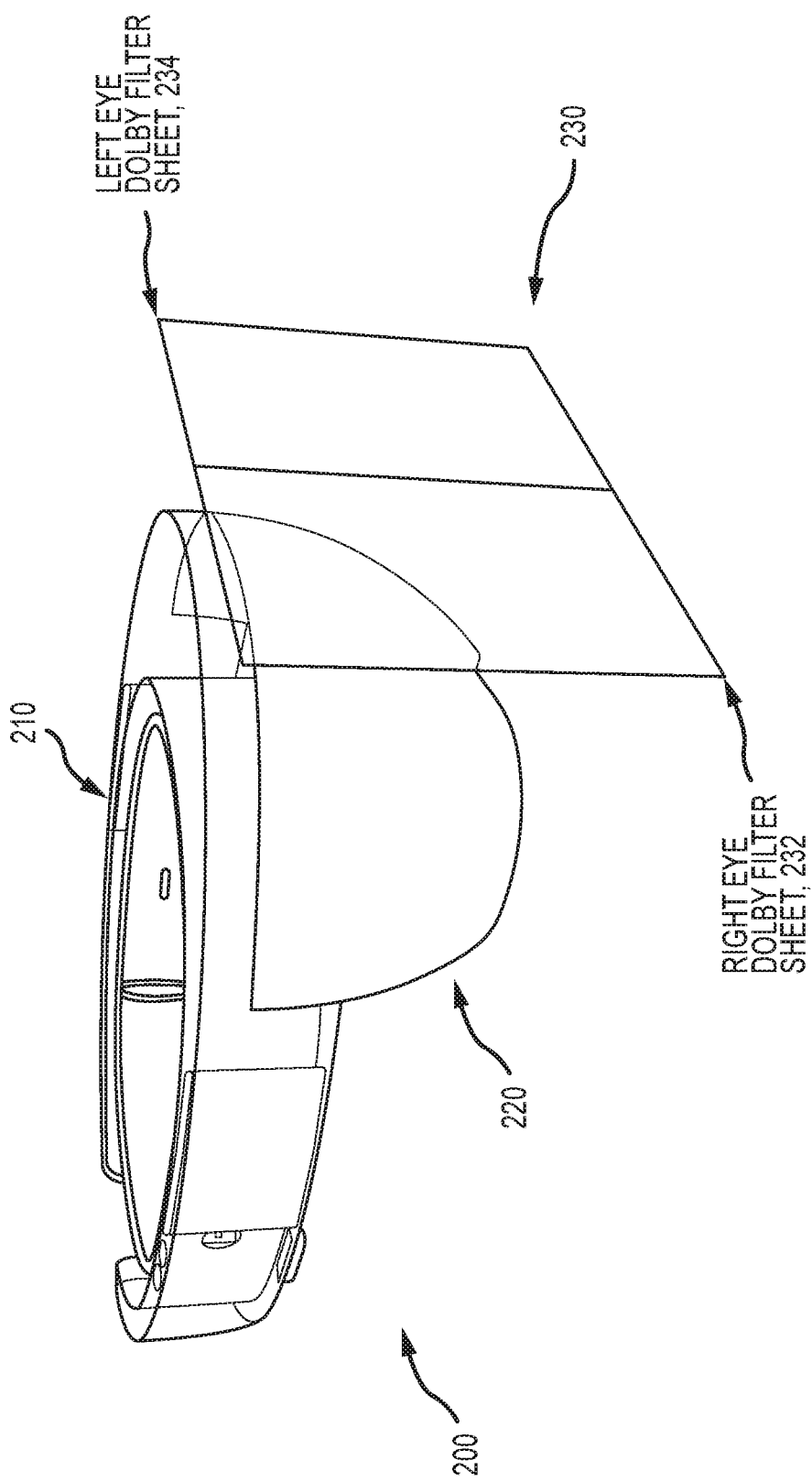
FIG. 2 illustrates a side perspective view showing in a schematic or simplified manner an AR HMD of the present description that may be useful in the AR system of FIG. 1.

At this point in the description, it may be useful to describe several AR HMD embodiments that may be used in an AR system (such as system 100 of FIG. 1) with a variety of stereo display or projection technologies to provide stereo images to a viewer wearing the AR HMD. FIG. 2 is a schematic or simplified side perspective view of an AR HMD 200 of the present description. The AR HMD 200 is adapted for use with an interference filter-type stereo projection system or display (e.g., 3D television). The AR HMD 200 includes a physical support assembly 210 in the form a typical headset used in many commercially available AR HMDs. Further, the AR HMD 200 includes an HMD optical system 220 that is shown to include transparent displays positioned, when the support 210 is worn by a viewer/AR participant, over the viewer's left and right eyes. The HMD optical system 220 may take a wide variety of forms to implement the AR HMD 200 such as optical systems presently used in AR HMDs to project or otherwise display left and right eye images onto the transparent displays that cause the viewer to perceive left and right eye images (stereo content) that provides augmenting data (e.g., images, data, and the like) a focus distance from the viewer's eyes in an AR space/real world environment.

The AR HMD 200 includes an external 3D screen viewing assembly 230 that is configured for use with interference filter stereo displays/projection systems, and the view is "simplified" in that the components of the assembly 230 typically would be integrated within and supported by the assembly 210 as is shown for system 220. To facilitate use with interference filter displays, the assembly 230 includes a right eye interference filter or filter sheet 232 and a left eye interference filter or filter sheet 234, and these two filters 232 and 234 are positioned within the support assembly 210 to be covering the right and left eyes (not shown) of a wearer of the AR HMD 200. For example, the filter sheets 232 may be planar as shown (or curved to match the displays of the optical system 220) and generally arranged to be parallel to the displays of the optical system 220. The filters 232, 234 may be spaced apart from the displays of the optical system 220 (e.g., 0.1 to 1 inch) or abutting these displays and may be provided external to the system 220 (as shown) or be disposed between the displays of the system 220 and the viewer's eyes.

The right eye interference filter 232 is configured to filter all but right eye images displayed using interference techniques on a projection/display screen while the left eye interference filter 234 is configured to filter all but left eye images displayed using interference techniques on the same projection/display screen. In one case, the projection/display system uses Dolby 3D "recipes" for interference projection/display, and the sheets/filters 232, 234 may be right and left eye Dolby filter sheets such that the AR HMD 200 is configured to deliver right and left eye images to a wearer through the filters 232 and 234 and also through the transparent displays of the system 220 (that may be concurrently displaying augmenting content).

Figure 3:
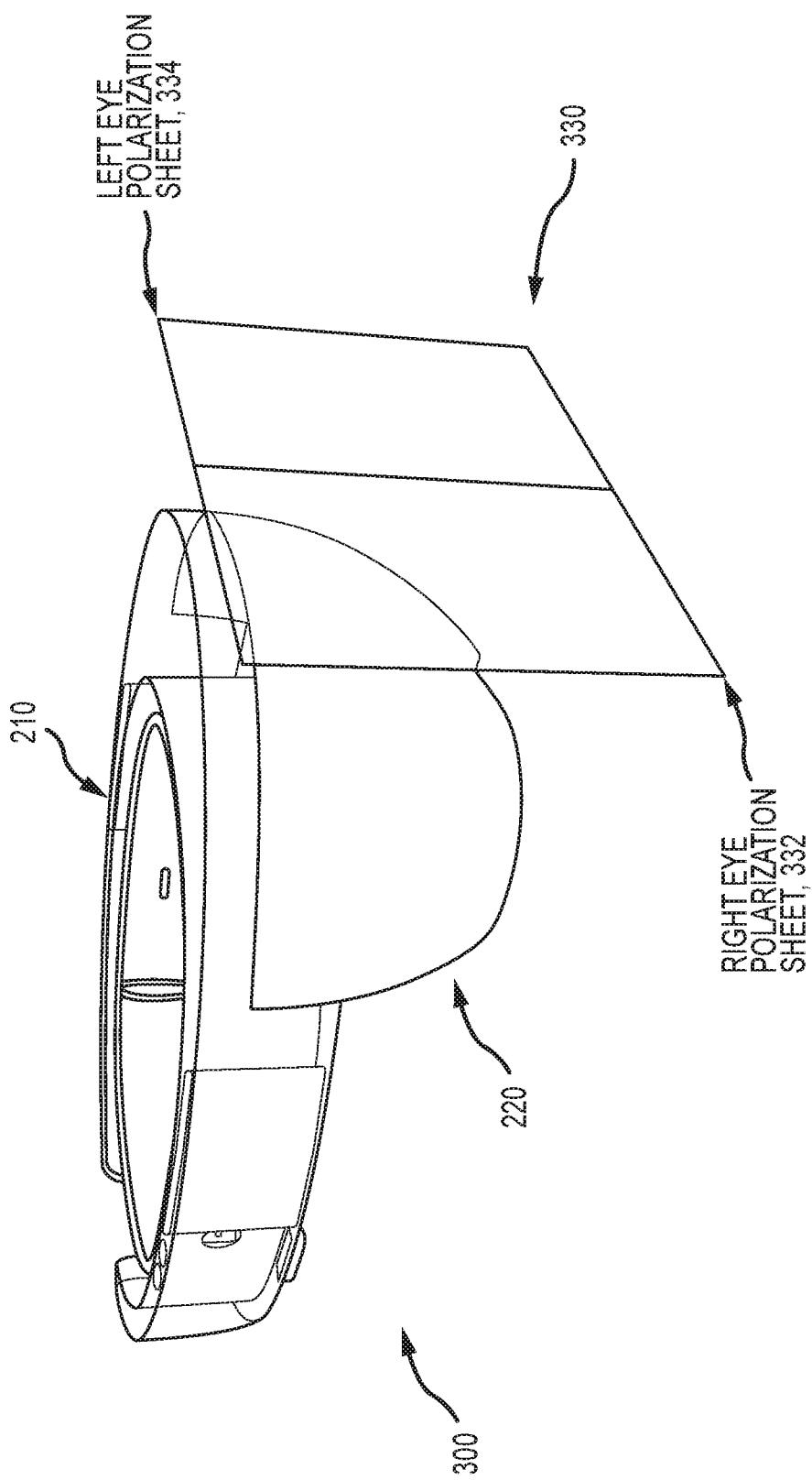
FIG. 3 illustrates a side perspective view showing in a schematic or simplified manner an AR HMD similar to that shown in FIG. 2 but utilizing a different embodiment of an external 3D screen viewing assembly.

FIG. 3 is a schematic or simplified side perspective view of another AR HMD 300 of the present description. The AR HMD 300 includes a support assembly 210 and optical system 220 as found in the AR HMD 200 of FIG. 2, but the AR HMD 300 differs in that it includes an external 3D screen viewing assembly 330 that is configured for use with a polarization-type stereo display/projection system. In this regard, the viewing assembly 330 includes a right eye polarization sheet or filter 332 and a left eye polarization sheet or filter 334 that are contained or positioned within the support assembly 210 so as to be positioned over the right and left eye displays of the optical system 220 and of a viewer wearing the AR HMD 300.

The right eye polarization sheet 332 is configured to pass through light having a particular polarization to provide right eye images displayed on a display (3D television) or projection screen (by a 3D or stereo projector projection superimposed right and left eye images with two differing polarizations), and the left eye polarization sheet 334 is configured to pass through light having a particular polarization (differing from the right eye light/images) to provide left eye images displayed on the same display or projection screen. In this way, the AR HMD 300 is useful for concurrently providing augmentation of a real world environment with the optical system 220 and with a polarization-type stereo display/projection system via the external screen viewing assembly 330.

Figure 4:
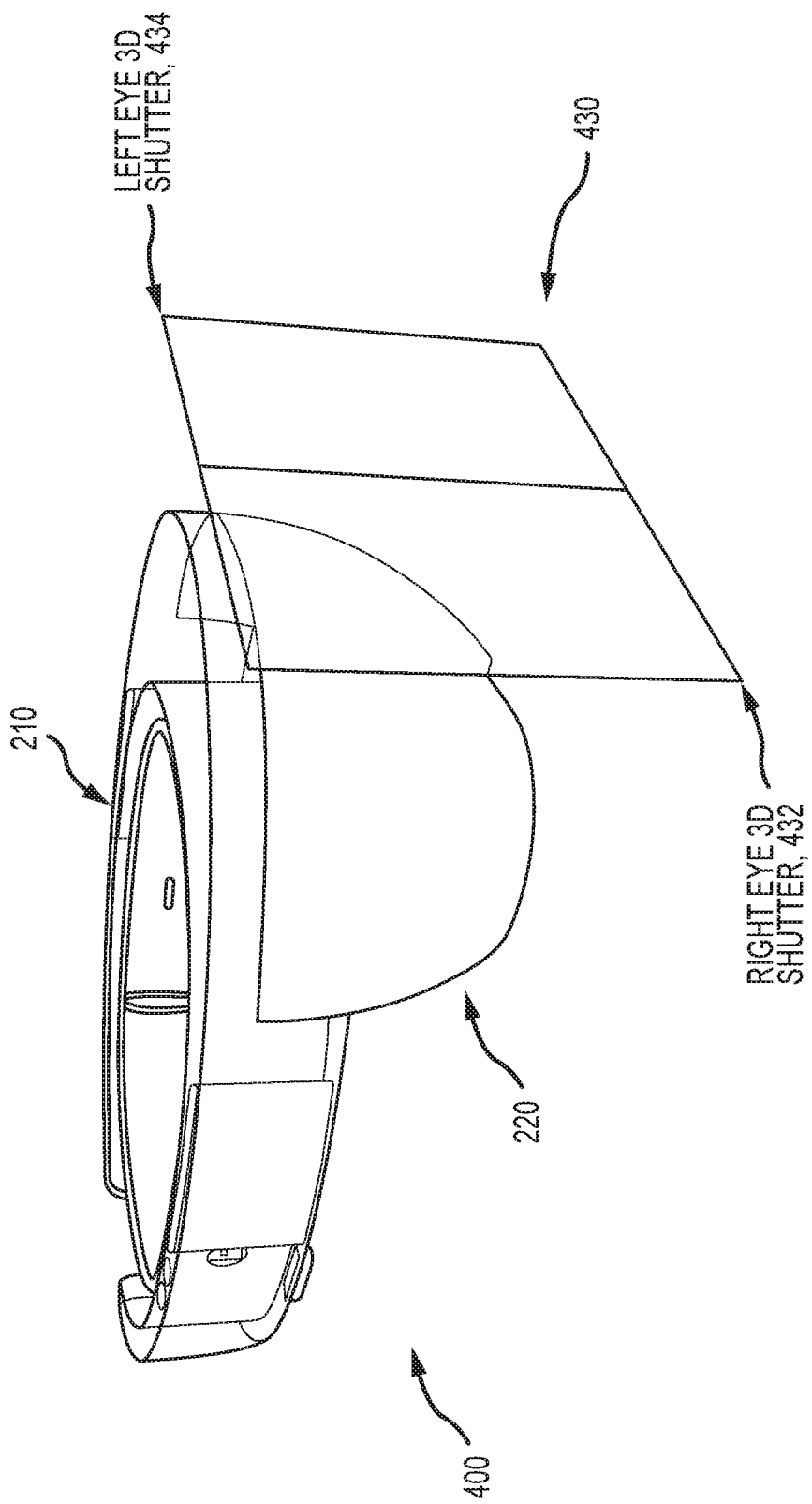
FIG. 4 illustrates a side perspective view showing in a schematic or simplified manner an AR HMD similar to that shown in FIGS. 2 and 3 but utilizing a different embodiment of an external 3D screen viewing assembly.

FIG. 4 is a schematic or simplified side perspective view of another AR HMD 400 of the present description. The AR HMD 400 includes a support assembly 210 and optical system 220 as found in the AR HMD 200 of FIG. 2, but the AR HMD 400 differs in that it includes an external 3D screen viewing assembly 430 that is configured for use with an eclipse/shutter (or switching)-type stereo display/projection system. In this regard, the viewing assembly 430 includes a right eye shutter (or shutter element) 432 and a left eye shutter (or shutter element) 434 that are contained or positioned within the support assembly 210 so as to be positioned over the right and left eye displays of the optical system 220 and of a viewer wearing the AR HMD 400.

The right eye shutter 432 is configured to be open (or otherwise to transmit light) to pass through light when right eye images are displayed on a display (3D television) or projection screen (by a 3D or stereo projector) switching between right and left eye image display/projection, and the left eye shutter 434 is configured to be open (or otherwise to transmit light) to pass through light when left eye images are displayed on a display (3D television) or projection screen (by a 3D or stereo projector) to provide left eye images to the viewers left eye. In this way, the AR HMD 400 is useful for concurrently providing augmentation of a real world environment with the optical system 220 and with a shutter (or switching)-type stereo display/projection system via the external screen viewing assembly 430.

Figure 5:
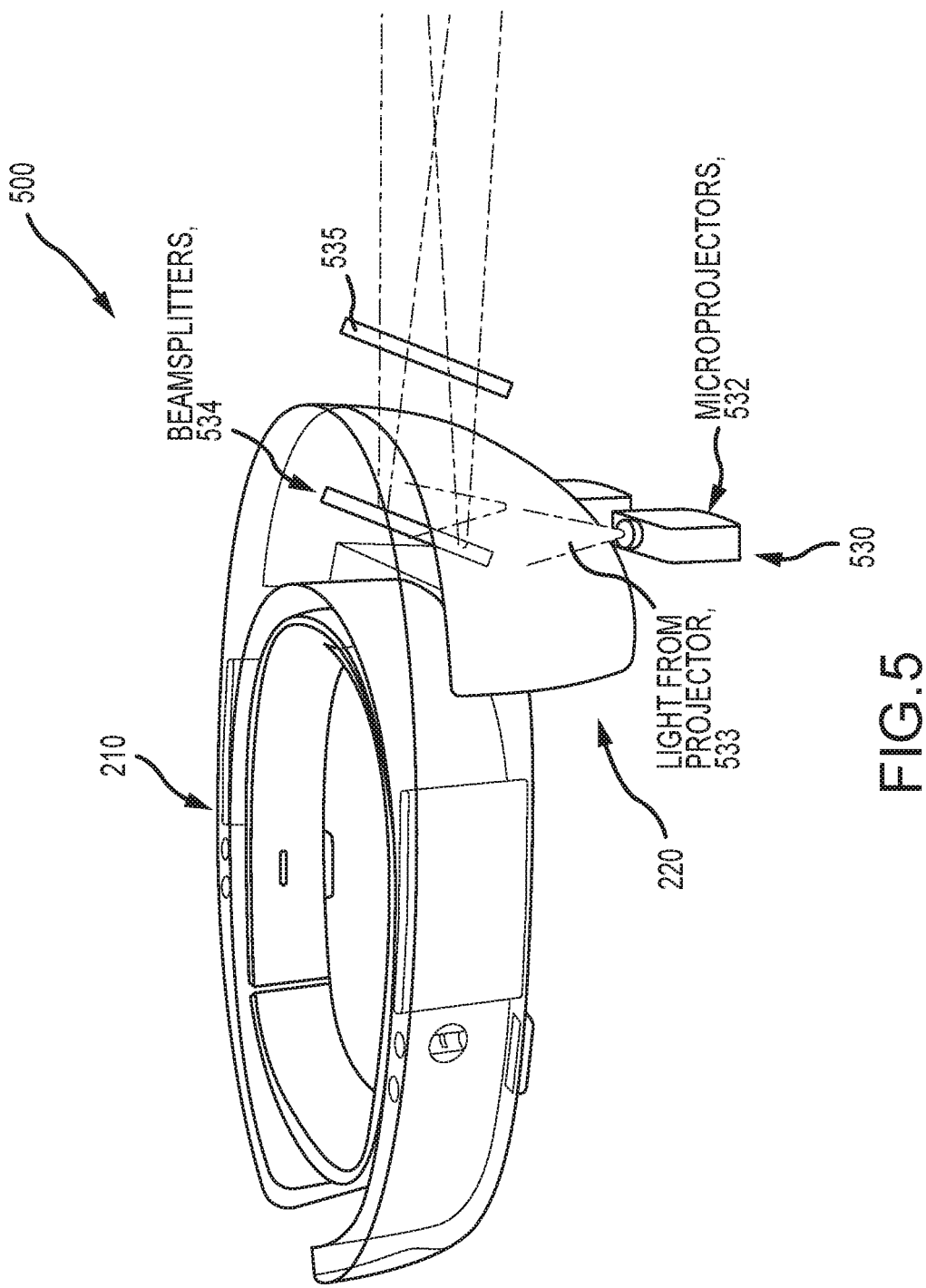
FIG. 5 illustrates a side perspective view showing in a schematic or simplified manner an AR HMD similar to that shown in FIGS. 2-4 but utilizing a different embodiment of an external 3D screen viewing assembly.

FIG. 5 is a schematic or simplified side perspective view of yet another AR HMD 500 of the present description. The AR HMD 500 includes a support assembly 210 and optical system 220 as found in the AR HMD 200 of FIG. 2, but the AR HMD 500 differs in that it includes an external 3D screen viewing assembly 530 that is configured for providing the stereo content (e.g., to include the 3D projectors) that can be viewed concurrently with the augmenting information from optical system 220. This is a special and particularly versatile case using retroreflective stereo projection to augment the imagery provide by the HMD optical system 220. As shown, small video projectors 532 are provided that are each associated with one eye of the wearer of the AR HMD 500. The projectors 532 each launch a separate view (i.e., right and left eye image streams), as shown with projected light 533, toward a retroreflective screen (not shown but may be the projection screen 140 in FIG. 1).

When the AR HMD 500 is used in an AR system (such as system 100 of FIG. 1), the remote or external "screen" may be made up of any surface overlaid with retroreflective screen material. For instance, in addition to more or less flat surfaces designed specifically to support distant projection, various props, costumes worn by people, structural elements in an AR space, and the like can all be used to support retroreflective materials and projection from the AR HMD 500. With the use of projectors 532 mounted on the support assembly 210 proximate to the left and right eyes of a wearer of the AR HMD 500, objects (covered with retroreflective material) that are supposed to be close may be placed closer to the viewer in the AR space while objects that are supposed to be far off can be placed further away from the viewer in the AR space, with corresponding imagery perceived at correct distances.

The output light (right and left images) 533 from the right and left eye microprojectors 532 may be directed toward beamsplitters 534 positioned adjacent the right and left eye displays of the transparent HMD optical system 220 such that light 535 is reflected outward or to be projected toward one or more screens covered (at least partially) with retroreflective screen material in the nearby AR space/real world environment. The retroreflective screen material will reflect or direct the light directly back through the beamsplitter 534 and transparent displays of the optical system 220 and to the viewer's right and left eyes. Note, many AR HMDs are presently designed to include beamsplitters 534 as part of the optical system 220, and the same beamsplitters 534 may be used to bounce light 533 from conveniently mounted microprojectors 532 to the remote/external screen, which simplifies the design of the AR HMD 500.

With useful AR HMDs understood, it now may be useful to turn to how AR systems may be configured with such AR HMDs and associated projection/display systems to provided layered depth effects to an AR participant. FIG. 6 illustrates an AR system 600 during its operations to provide a depth-augmented AR experience to a viewer or AR participant. Particularly, an AR participant would wear the AR HMD 610 while in the AR space illustrated. The AR HMD 610 may take the form of any of the AR HMDs described above with overlaid 3D glasses capability such as AR HMDs 200, 300, and 400 of FIGS. 2-4. The transparent optical system of the AR HMD 610 is shown to be configured with a fixed focal distance (e.g., in the range of 1 to 8 feet or the like) for its displayed images to provide an AR display focal plane 620. As known in the art, the media displayed with the HMD optical system can be configured (and selected by an onboard controller) to provide images 622 that are forward comfortable relative to the focal plane 620 (e.g., at a forward comfortable AR HMD display depth of 1 to 3 feet or the like in front to the focal plane 620) or images 624 that are rearward comfortable relative to the focal plane 620 (e.g., at a rearward comfortable AR HMD display depth of 1 to 3 feet or the like in back of the focal plane 620).

Concurrently, stereo images may be projected upon a large 3D screen 630 by a 3D projector(s), e.g., by projector 142 of FIG. 1. The projection technology used to project the stereo images/content is matched with the 3D glasses capability (3D stereo technology) provided in the AR HMD 610 (e.g., one of the external 3D screen viewing assemblies 230, 330, 430 of FIGS. 2-4) so that left and right eye images (stereo content) displayed are viewable by a wearer of the AR HMD 610. As with the images provided by the AR HMD optical system, the stereo content or projected media may be configured so that it is perceived at the location of the screen 630, in front of the screen 630 as shown with images 632 provided at a forward comfortable 3D display depth (e.g., 1 to 6 feet or the like from screen 630), or in back of the screen 630 as shown with images 634 at a rearward comfortable 3D display depth (e.g., 1 to 6 feet or the like from screen 630). In this manner, a designer/operator of the AR system 600 may provide layered depth with close in images 622, 624 with the transparent optical system of the AR HMD 610 and with remote or further away images 632, 634 displayed on screen 630 and visible through the external 3D screen viewing assembly (overlaid 3D glasses capability) of the AR HMD 610.

Figure 7:
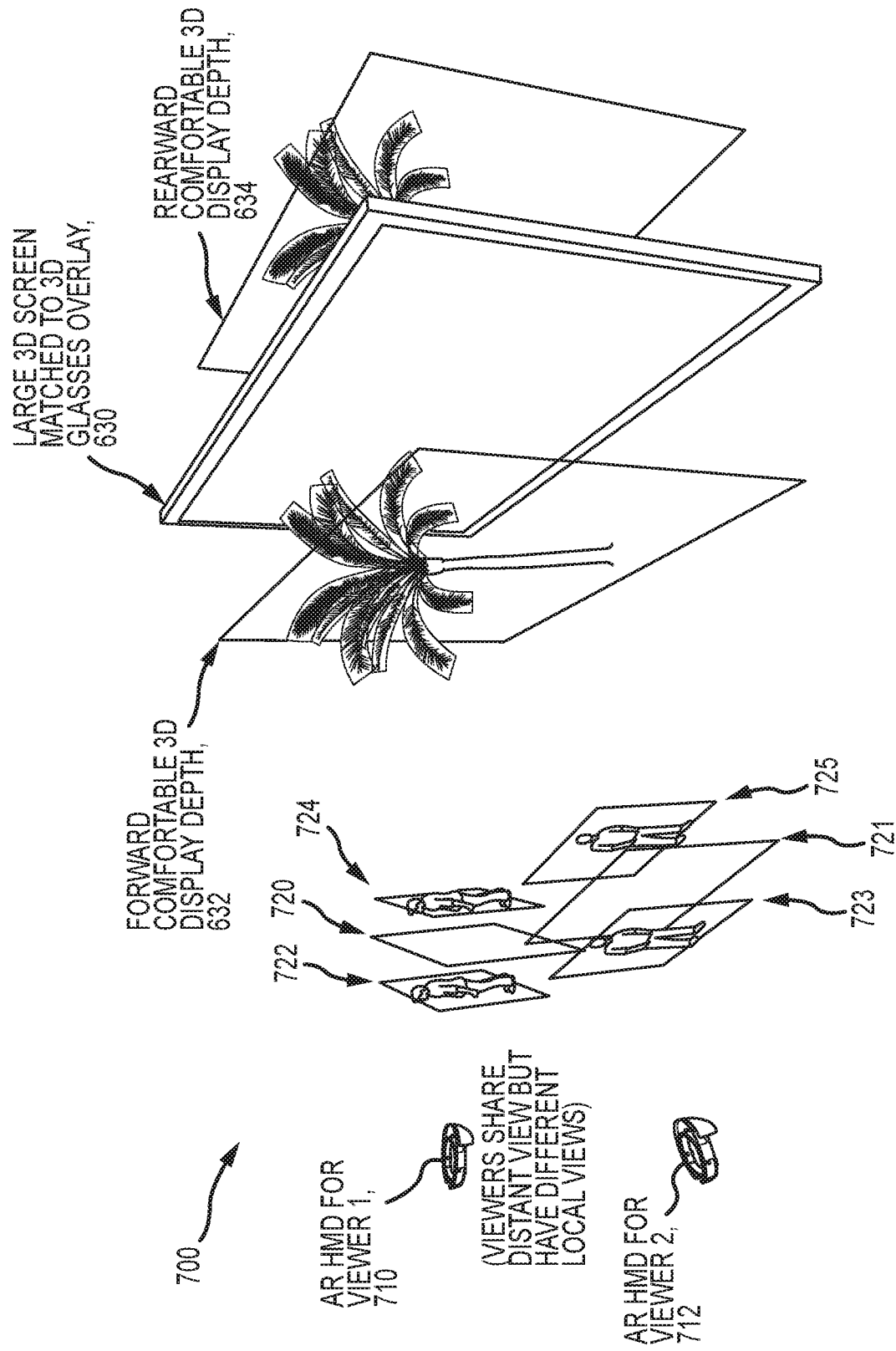
FIG. 7 is a schematic illustration similar to FIG. 6 of an AR system operating according to the present description to provide a depth layering or augmenting concurrently for two viewers or AR participants.

FIG. 7 illustrates an AR system 700 during its operations to concurrently provide two depth-augmented AR experiences to two viewers or AR participants. Particularly, first and second AR participants would wear the AR HMDs 710 and 712 while in the AR space illustrated. The AR HMDs 710 and 712 may take the form of any of the AR HMDs described above with overlaid 3D glasses capability such as AR HMDs 200, 300, and 400 of FIGS. 2-4.

The transparent optical systems of the AR HMDs 710 and 712 are shown to be configured with a fixed focal distance (e.g., in the range of 1 to 8 feet or the like) to provide displayed images with AR display focal planes 720 and 721. As known in the art, the stereo content or media displayed with the HMD optical systems can be configured (and selected by an onboard controller) to provide images 722 and 723 that are forward comfortable relative to the focal planes 720 and 721, respectively (e.g., at a forward comfortable AR HMD display depth of 1 to 3 feet or the like in front to the focal planes 720 and 721) or images 724 and 725 that are rearward comfortable relative to the focal planes 720 and 721 (e.g., at a rearward comfortable AR HMD display depth of 1 to 3 feet or the like in back of the focal planes 720 and 721). The local views/images 722, 724 may match or, more typically, differ from the local views/images 723, 725 as is shown in FIG. 7.

However, the AR participants wearing the AR HMDs 710 and 712 would share the distant view. In this way, the AR system 700 can provide shared or similar AR experiences (similar remote imagery augmenting the real world AR space) while also enjoying unique AR experiences with local images suited to their location, game play, or other parameters. To this end (as discussed with reference to FIG. 6), concurrently, stereo images may be projected upon the large 3D screen 630 by a 3D projector(s), e.g., by projector 142 of FIG. 1. The projection technology used to project the stereo images/content is matched with the 3D glasses capability (3D stereo technology) provided in the AR HMD 610 (e.g., one of the external 3D screen viewing assemblies 230, 330, 430 of FIGS. 2-4) so that left and right eye images (stereo content) displayed are viewable by a wearer of the AR HMD 610.

As with the images provided by the AR HMD optical system, the stereo content or projected media may be configured so that it is perceived at the location of the screen 630, in front of the screen 630 as shown with images 632 provided at a forward comfortable 3D display depth (e.g., 1 to 6 feet or the like from screen 630), or in back of the screen 630 as shown with images 634 at a rearward comfortable 3D display depth (e.g., 1 to 6 feet or the like from screen 630). In this manner, a designer/operator of the AR system 600 may provide layered depth with close in images 622, 624 with the transparent optical system of the AR HMD 610 and with remote or further away images 632, 634 displayed on screen 630 and visible through the external 3D screen viewing assembly (overlaid 3D glasses capability) of the AR HMD 610.

Figure 8:
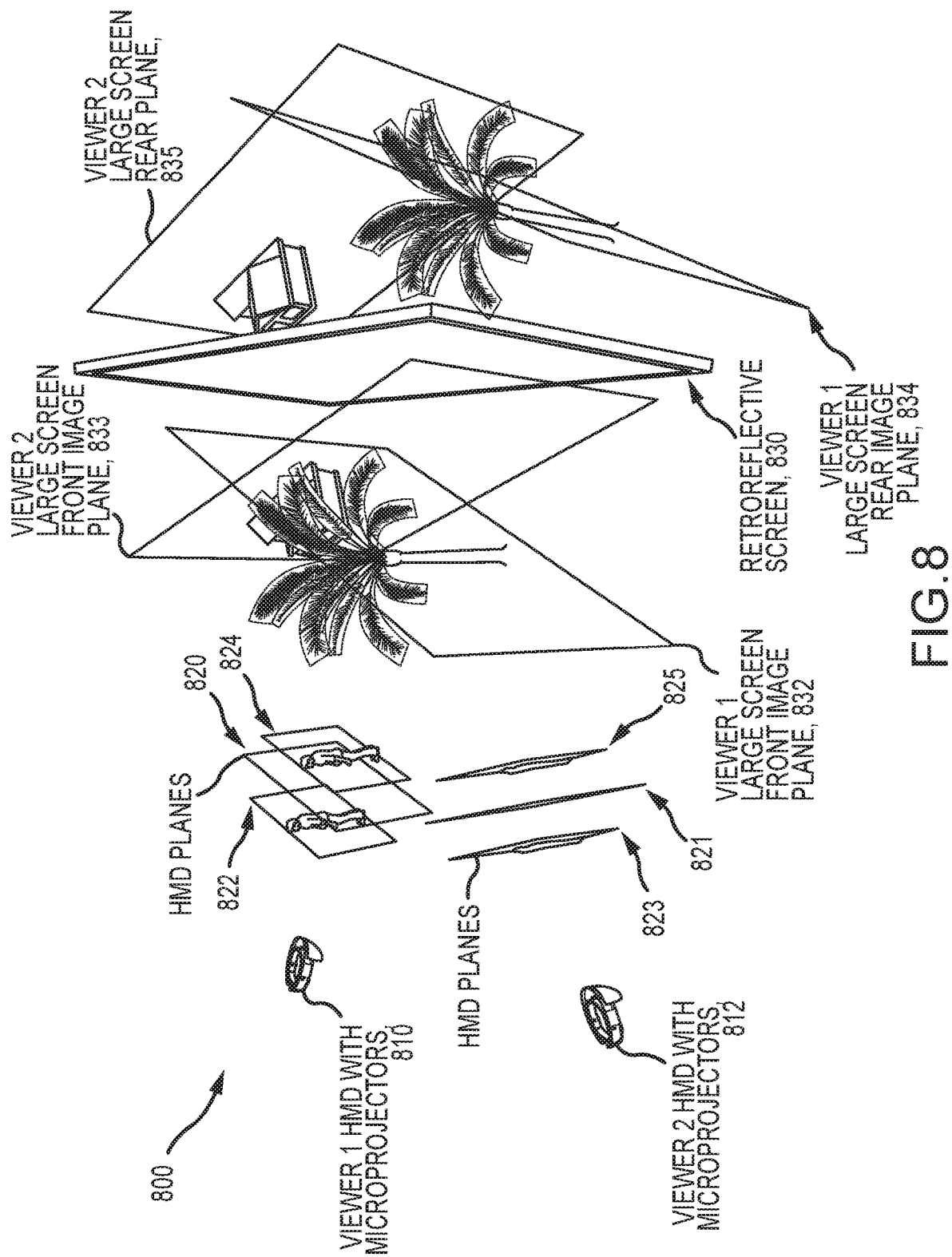
FIG. 8 is a schematic illustration similar to FIG. 7 of an AR system operating to provide depth layering concurrently for two viewers or AR participants but differing from FIG. 7 in its use of a retroreflective screen for the 3D projection screen and using microprojectors to provide the 3D content in the augmenting depth layers.

FIG. 8 illustrates another AR system 800 operating to provide multiple AR participants in an AR space with differing AR experiences by providing each AR participant or viewer with different HMD-provided and projected, remote views/imagery. As shown, first and second AR participants wear AR HMDs 810 and 812 while in the AR space illustrated. The AR HMDs 810 and 812 may take the form of the AR HMD 500 of FIG. 5.

The transparent optical systems of the AR HMDs 810 and 812 are shown to be configured with a fixed focal distance (e.g., in the range of 1 to 8 feet or the like) to provide displayed images with AR display focal planes 820 and 821. As known in the art, the stereo content or media displayed with the HMD optical systems can be configured (and selected by an onboard controller) to provide images 822 and 823 that are forward comfortable relative to the focal planes 820 and 821, respectively (e.g., at a forward comfortable AR HMD display depth of 1 to 3 feet or the like in front to the focal planes 820 and 821) or images 824 and 825 that are rearward comfortable relative to the focal planes 820 and 821 (e.g., at a rearward comfortable AR HMD display depth of 1 to 3 feet or the like in back of the focal planes 820 and 821). The local views/images 822, 824 may match or, more typically, differ from the local views/images 823, 825 as is shown in FIG. 8.

Each of the AR HMDs 810 and 812 includes microprojectors (as shown with projectors 532) to project left and right eye content for each of the AR participants wearing the AR HMDs 810 and 812. A 3D projection screen 830 is positioned in the AR space, such as at a distance from the viewers that is greater than the focal distances of the optical systems of the AR HMDs 810, 812. The screen 830 includes a surface (facing the AR participants) made up of retroreflective material (or retroreflective screen material). Hence, as shown, the AR participants wearing the AR HMDs 810 and 812 can sometimes share the distant view or be provided differing views with content provided by their onboard microprojectors in the AR HMDs 810 and 812. In this way, the AR system 800 can provide shared or similar AR experiences (similar local and/or remote imagery augmenting the real world AR space) while also being able to allow each AR participant to enjoy unique AR experiences with local and remote images suited to their location, game play, or other parameters.

To this end (as discussed with reference to FIG. 5), concurrently, stereo images may be projected upon the large 3D screen 830 by a pair of projector(s) in each of the HMDs 810 and 812, e.g., by projectors 532 of FIG. 5. The use of the left and right eye projectors in each of the AR HMDs 810 and 812 allows right and left eye images to be projected from the AR HMDs 810 and 812 at locations and angles such that light is reflected back from the retroreflective material of screen 830 to the right and left eyes of the appropriate AR participant wearing the AR HMD 810 or AR HMD 812.

As with the images provided by the AR HMD optical system, the stereo content or projected media may be configured so that it is perceived at the location of the screen 830, in front of the screen 830 as shown with images 832 (for the first AR participant) or images 833 (for the second AR participant) provided at a forward comfortable 3D display depth (e.g., 1 to 6 feet or the like from screen 830), or in back of the screen 830 as shown with images 834 (for the first AR participant) or images 835 (for the second AR participant) at a rearward comfortable 3D display depth (e.g., 1 to 6 feet or the like from screen 830). In this manner, a designer/operator of the AR system 800 may provide layered depth with close in images 822, 824 (for the first AR participant) or images 823, 825 (for the second AR participant) with the transparent optical systems of the AR HMDs 810 and 812 and with remote or further away images 832, 834 (for the first AR participant) or images 833, 835 (for the second AR participant) reflected from screen 830.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

The inventive AR systems taught herein provide a low cost and versatile way of adding additional visual planes to AR displays. In large scale applications (such as a theatrical show, a large AR venue, and so no), the AR systems can allow all viewers in a theater or other setting to see a shared 3D view on a large screen as well as to view a smaller, more intimate and personalized local view. The AR system can be used in consumer-type products. In large applications and smaller consumer-type systems, the concepts taught enable a number of personalized-view games to be achieved, support custom storytelling, and support participants speaking different languages (e.g., the augmented information may be language-specific to the AR participant).

As another important use case or example, in a home with a 3D television, the new AR system may be configured to use a TV display (e.g., an HMD or other commercially-available television or monitor/display device) as either a backdrop for some part of the game action or, for instance, a 3D scoreboard, a fixed "power-up", or the like. In this case, the display screen/device in the AR system may not be very large (may not enlarge the overall view), but it may desirably add another shared canvas for the viewer and/or serve as a fixed display shared by all participants of the game in stereo. In some implementations, the AR system will use a viewer's home non-stereo television (to add more canvas for imagery).

Similarly, the new AR system may include an AR HMD used with a very large mono screen, e.g., as might occur in a theme park or the like where the large screen. In such cases, if the large screen is far enough away, images displayed thereon will seem like a believable "distant" background for closer-up action that occurs in the AR HMD.

We claim:

1. An augmented reality (AR) system for providing augmenting images at additional depth layers to AR participants, comprising:
   an AR space;
   an AR head mounted display (HMD) wearable by an AR participant in the AR space; and
   in the AR space, a display screen displaying stereo content using a stereo display technology,
   wherein an optical system in the AR HMD displays to the AR participant wearing the AR HMD objects at an HMD focal distance via transparent displays, and
   wherein the AR HMD includes an external screen viewing assembly adapted based on the stereo display technology to receive light associated with the displayed stereo content on the display screen and provide left eye content to a left eye of the AR participant wearing the AR HMD and right eye content to a right eye of the AR participant wearing the AR HMD.

2. The AR system of claim 1, wherein the display screen is positioned in the AR space a distance from the AR participant that differs from the HMD focal distance.

3. The AR system of claim 1, wherein the stereo display technology is an interference filter-based technology and wherein the external screen viewing assembly includes left and right eye interference filter sheets positioned to be between the left and right eyes, respectively, of the AR participant wearing the AR HMD and the display screen.

4. The AR system of claim 3, wherein the display screen comprises a projection screen and the system further comprises a 3D projector projecting stereo content using the interference filter-based technology.

5. The AR system of claim 1, wherein the stereo display technology is a polarization-based technology and wherein the external screen viewing assembly includes left and right eye polarization sheets positioned to be between the left and right eyes, respectively, of the AR participant wearing the AR HMD and the display screen.

6. The AR system of claim 5, wherein the display screen comprises a projection screen and the system further comprises a 3D projector projecting stereo content using the polarization-based technology.

7. The AR system of claim 1, wherein the stereo display technology is a 3D shutter-based technology and wherein the external screen viewing assembly includes left and right eye 3D shutters positioned to be between the left and right eyes, respectively, of the AR participant wearing the AR HMD and the display screen.

8. The AR system of claim 7, wherein the display screen comprises a projection screen, wherein the system further comprises a 3D projector projecting stereo content using the 3D shutter-based technology, and wherein the 3D projector and the left and right eye 3D shutters are time synchronized with the left eye 3D shutter open and the right eye shutter closed when the 3D projector projects left eye portions of the stereo content on the projection screen and with the right eye 3D shutter open and the left eye shutter closed when the 3D projector projects right eye portions of the stereo content on the projection screen.

9. The AR system of claim 1, wherein the stereo display technology is a retroreflective imaging-based technology, wherein the external screen viewing assembly includes left and right eye projectors positioned in the AR HMD to project left and right eye content into the AR space and onto a surface of the display screen, and wherein the surface comprises retroreflective screen material.

10. The AR system of claim 9, wherein the optical system of the AR HMD comprises a left eye beamsplitter and a right eye beamsplitter and wherein the left and right eye projectors of the external screen viewing assembly project light onto a side of the beamsplitter for reflection outward from the AR HMD into the AR space.

11. The AR system of claim 1, wherein the display screen is a screen of a 3D television displaying the stereo content on the screen and wherein the external screen viewing assembly includes left and right eye elements adapted according to the stereo technology employed by the 3D television in the displaying of the stereo content.

12. The AR system of claim 1, wherein the AR participant's simultaneous angular viewing range is enlarged to be in the range of 55 to 160 degrees.

13. An augmented reality (AR) system, comprising:
   an AR space;
   a first AR head mounted display (HMD) wearable by a first AR participant in the AR space;
   a second AR HMD wearable by a second AR participant in the AR space; and
   in the AR space, a display screen displaying stereo content using a stereo display technology,
   wherein a transparent optical system in each of the first and second AR HMDs displays to the first and second AR participants wearing the first and second AR HMD first and second augmenting images at an HMD focal distance, and
   wherein each of the first and second AR HMDs includes an external screen viewing assembly adapted based on the stereo display technology to receive light associated with the displayed stereo content on the display screen and provide left eye content to a left eye of the first or second AR participant wearing the first or second AR HMD and right eye content to a right eye of the first or second AR participant wearing the first or second AR HMD.

14. The AR system of claim 13, wherein the stereo display technology is an interference filter-based technology, a polarization-based technology, or a 3D shutter-based technology.

15. The AR system of claim 14, wherein the first augmenting images differ from the second augmenting images.

16. The AR system of claim 14, wherein the display screen displays the stereo content concurrently with the transparent optical systems of the first and second AR HMDs displaying the first and second augmenting images.

17. The AR system of claim 13, wherein the stereo display technology is a retroreflective imaging-based technology, wherein the external screen viewing assembly of the first and second AR HMDs includes left and right eye projectors projecting left and right eye content, and wherein the display screen comprises retroreflective screen material.

18. The AR system of claim 17, wherein the first augmenting images differ from the second augmenting images and wherein the displayed stereo content differs for each of the first and second AR HMDs.

19. An augmented reality (AR) system for providing augmenting images at additional depth layers to AR participants, comprising:
- an AR head mounted display (HMD);
- a projection screen positioned in a space including physical objects viewable through an optical system of the AR HMD;
- a projector, configured to operate based on a stereo projection technology, projecting stereo content using the stereo projection technology, wherein a transparent optical system in the AR HMD displays to a viewer, wearing the AR HMD, digital augmenting information at an HMD focal distance; and
- a viewing assembly, provided in the AR HMD and configured to have 3D glasses capability matching the stereo projection technology, selectively transmitting left eye content and right eye content when light from the projection screen during the projecting of the stereo content is received at the AR HMD,
- wherein the projection screen is positioned in the space a distance from the AR participant that is greater than the HMD focal distance.

20. The AR system of claim 19, wherein the stereo projection technology is an interference filter-based technology and wherein the viewing assembly includes left and right eye interference filter sheets suited to the interference filter-based technology of the projector.

21. The AR system of claim 19, wherein the stereo projection technology is a polarization-based technology and wherein the viewing assembly includes left and right eye polarization sheets suited to the polarization-based technology of the projector.

22. The AR system of claim 19, wherein the stereo projection technology is a 3D shutter-based technology, wherein the viewing assembly includes left and right eye shutters positioned to be between left and right eyes, respectively, of a viewer wearing the AR HMD and the projection screen, wherein the projector projects the stereo content using the 3D shutter-based technology, and wherein the projector and the left and right eye 3D shutters are time synchronized with the left eye 3D shutter open and the right eye shutter closed when the 3D projector projects left eye portions of the stereo content on the projection screen and with the right eye 3D shutter open and the left eye shutter closed when the 3D projector projects right eye portions of the stereo content on the projection screen.

23. The AR system of claim 19, wherein the stereo projection technology is a retroreflective imaging-based technology, wherein the screen viewing assembly includes left and right eye projectors positioned in the AR HMD to project left and right eye content into the space, and wherein the surface comprises retroreflective screen material.

24. The AR system of claim 23, wherein the optical system of the AR HMD comprises a left eye beamsplitter and a right eye beamsplitter and wherein the left and right eye projectors of the external screen viewing assembly project light onto a side of the beamsplitter for reflection outward from the AR HMD into the AR space.

25. The AR system of claim 19, further comprising a tracking device tracking movement of the viewer's head and wherein both the stereo content projected by the projector and the digital augmenting information displayed by the transparent optical system are modified to suit the tracked movement.

* * * * *